United States Patent
Cao et al.

(10) Patent No.: US 12,145,887 B2
(45) Date of Patent: Nov. 19, 2024

(54) MULTIPHASE CERAMIC MATERIAL WITH GIANT DIELECTRIC CONSTANT, AND PREPARATION METHOD THEREOF

(71) Applicant: GUANGDONG FENGHUA ADVANCED TECHNOLOGY HOLDING CO., LTD., Guangdong (CN)

(72) Inventors: Xiuhua Cao, Guangdong (CN); Jianmei Liu, Canberra (AU); Dehong Chen, Canberra (AU); Haidong Ren, Guangdong (CN); Yun Liu, Canberra (AU); Terry James Frankcombe, Canberra (AU); Zhenxiao Fu, Guangdong (CN); Shiwo Ta, Guangdong (CN)

(73) Assignee: GUANGDONG FENGHUA ADVANCED TECHNOLOGY HOLDING CO., LTD., Zhaoqing (CN)

( * ) Notice: Subject to any disclaimer, the term of this patent is extended or adjusted under 35 U.S.C. 154(b) by 850 days.

(21) Appl. No.: 17/296,259

(22) PCT Filed: Mar. 29, 2020

(86) PCT No.: PCT/CN2020/081953
§ 371 (c)(1),
(2) Date: May 24, 2021

(87) PCT Pub. No.: WO2021/184414
PCT Pub. Date: Sep. 23, 2021

(65) Prior Publication Data
US 2022/0127197 A1 Apr. 28, 2022

(30) Foreign Application Priority Data
Mar. 20, 2020 (CN) .......................... 202010205096.0

(51) Int. Cl.
*C04B 35/462* (2006.01)
*C04B 35/622* (2006.01)
(Continued)

(52) U.S. Cl.
CPC .......... *C04B 35/462* (2013.01); *C04B 35/622* (2013.01); *C04B 35/6261* (2013.01);
(Continued)

(58) Field of Classification Search
CPC ........................ C04B 35/462; C04B 2235/662
See application file for complete search history.

(56) References Cited

U.S. PATENT DOCUMENTS

| 9,809,499 | B2 * | 11/2017 | Hirahara | .................. H01G 4/12 |
| 2010/0175735 | A1 * | 7/2010 | Uchida | .................. C01G 33/00 252/519.12 |
| 2014/0293506 | A1 * | 10/2014 | Hu | ........................ C01G 33/006 501/134 |

FOREIGN PATENT DOCUMENTS

| CN | 103958414 A | 7/2014 |
| CN | 110577401 A | * 12/2019 |

OTHER PUBLICATIONS

CN-110577401-A (Li) Dec. 17, 2019 (English language translation). [online] [retrieved Aug. 26, 2024]. Retrieved from: Clarivate Analytics. (Year: 2019).*

(Continued)

*Primary Examiner* — Erin Snelting

(57) ABSTRACT

The present invention discloses a multiphase ceramic material with a giant dielectric constant, wherein the multiphase ceramic material has a general formula of $A_xB_{nx}Ti_{1-(n+1)x}O_2$; wherein A is at least one selected from the group consisting of Nb, Ta, V, Mo, and Sb, B is at least one selected from the group consisting of In, Ga, Al, Co, Cr, Sc, Fe (III), and a trivalent rare-earth cation; n is a molar ratio of B to A, $1 \leq n \leq 5$, $0 < x \leq 0.1$. The multiphase ceramic material possesses (Continued)

outstanding properties including a giant dielectric constant, a low dielectric loss, and excellent frequency- and temperature-stability. In particular, it exhibits a high insulation resistivity of higher than $10^{11}\Omega\cdot cm$ and a high breakdown voltage, which implies it can be applied in high-energy storage devices and supercapacitors. This invention also provides a method to synthesize the multiphase ceramic material.

15 Claims, 4 Drawing Sheets

(51) Int. Cl.
   *C04B 35/626* (2006.01)
   *C04B 35/64* (2006.01)
   *H01B 3/12* (2006.01)
(52) U.S. Cl.
   CPC .... *C04B 35/6264* (2013.01); *C04B 35/62655* (2013.01); *C04B 35/62695* (2013.01); *C04B 35/64* (2013.01); *H01B 3/12* (2013.01); *C04B 2235/3234* (2013.01); *C04B 2235/6021* (2013.01); *C04B 2235/604* (2013.01); *C04B 2235/606* (2013.01); *C04B 2235/612* (2013.01); *C04B 2235/6562* (2013.01); *C04B 2235/6567* (2013.01); *C04B 2235/662* (2013.01); *C04B 2235/762* (2013.01); *C04B 2235/80* (2013.01)

(56) References Cited

OTHER PUBLICATIONS

Wanbiao Hu et al., Colossal Dielectric Permittivity in (Nb+Al) Codoped Rutile TiO2 Ceramics: Compositional Gradient and Local Structure, Chemistry of Materials, Jun. 25, 2015, ISSN:0897-4756, pp. 4934-4942, vol. 27, No. 14.
Baochun Guo, Study on the regulation of giant dielectric properties and polarization relaxation of doped TiO2 ceramics, Chinese Doctoral Dissertations Full-text Database, Nov. 1, 2018, pp. 30-50.

* cited by examiner

MULTIPHASE CERAMIC MATERIAL WITH GIANT DIELECTRIC CONSTANT, AND PREPARATION METHOD THEREOF

FIELD OF THE INVENTION

This invention relates to a multiphase ceramic material with a giant dielectric constant and its preparation method.

BACKGROUND OF THE INVENTION

Researches on the miniaturization of high-energy storage devices, supercapacitors and other equipment have shown that as an indispensable part of these devices and equipment, the dielectric material needs to simultaneously possess a giant dielectric constant, a low dielectric loss, and good frequency- and temperature-stability, and the high breakdown strength. The capacity of the energy storage device/equipment is proportional to the square of the working voltage of the dielectric material, suggesting that it is necessary to study the breakdown strength of dielectric ceramic materials.

Numerous studies have shown that ferroelectric materials, such as $BaTiO_3$, have a high dielectric constant. However, their dielectric constant is highly dependent on temperature. For other non-ferroelectric materials, such as $CaCuTi_3O_{12}$ (CCTO), doped NiO and $La_{2-x}Sr_xNiO_4$ ($x=\frac{1}{3}, \frac{1}{8}$), etc., although their dielectric constant can reach $10^5$ or more within a wide temperature range, their dielectric loss is very high (>0.1).

Therefore, there is a need to prepare a dielectric ceramic material with a high dielectric constant, a low dielectric loss, good temperature- and frequency-stability, and high breakdown strength.

SUMMARY OF THE INVENTION

The objective of the present invention is to provide a multiphase ceramic material with a giant dielectric constant to overcome the deficiencies of the prior art.

The technical solution of the present invention is a multiphase ceramic material with a giant dielectric constant, wherein the multiphase ceramic material has a general formula of $A_xB_{nx}Ti_{1-(n+1)x}O_2$, wherein A is at least one selected from the group consisting of Nb, Ta, V, Mo, and Sb, B is at least one selected from the group consisting of In, Ga, Al, Co, Cr, Sc, Fe (III), and a trivalent rare-earth cation; n is a molar ratio of B to A, $1<n\leq5$, $0<x\leq0.1$.

The multiphase ceramic material of the present application possesses outstanding dielectric properties including a giant dielectric constant, a low dielectric loss, and good frequency- and temperature-stability. In particular, it exhibits a high insulation resistivity and a high breakdown voltage. The ceramic material has an insulation resistivity of higher than $10^{11}\Psi\cdot cm$; it can be applied in high-energy storage devices and supercapacitors.

Preferably, a primary phase of the ceramic material is $A^{5+}$ and $B^{3+}$ co-doped rutile $TiO_2$, a secondary phase of the ceramic material is $B_2TiO_5$; the secondary phase is evenly dispersed in the primary phase. The primary phase provides the multiphase ceramic material with the giant dielectric property, while the secondary phase exhibits excellent electrical insulation properties. The secondary phase is discontinuously and uniformly distributed around the grain boundary of the primary phase. Therefore, it can effectively block the transfer of weakly bounded charges, which contributes to increasing the working voltage and breakdown voltage of the material. Meanwhile, the existence of the secondary phase does not cause the deterioration of the giant dielectric property of the material.

More preferably, the secondary phase is $B_2TiO_5$ with an orthogonal structure. During a one-step synthesis process, the secondary phase has a lower synthesis temperature comparing to that of the primary phase, helping to separate two phases.

Preferably, the multiphase ceramic material has a resistivity of higher than $10^{11}\Omega\cdot cm$.

Preferably, the multiphase ceramic material has a dielectric constant of higher than 10,000 at a frequency of 20 Hz to $2\times10^6$ Hz; the multiphase ceramic material has a dielectric loss of less than 0.05, when the frequency is lower than $2\times10^5$ Hz.

Preferably, the multiphase ceramic material has a dielectric constant of higher than 10,000 from $-160°$ C. to $170°$ C.; the multiphase ceramic material has a dielectric loss of less than 0.05 from $-50°$ C. to $150°$ C.

The present invention also provides a method of preparing the multiphase ceramic material with a giant dielectric constant, the method comprises steps of:

(1) weighing reactants, which comprise a titanium source, an A source, and a B source, according to a general formula of the multiphase ceramic material, $A_xB_{nx}Ti_{1-(n+1)x}O_2$;

(2) ball-milling in a ball-milling tank and drying to obtain a homogeneous mixture powder;

(3) transferring the mixture powder into a mortar; pure water is added, and the weight of the pure water is 5%-10% of the weight of the mixture powder; mixing thoroughly; transferring the mixture powder into a die, pressing at a pressure of at least 400 MPa to obtain a green pellet; placing the green pellet in a mortar; pulverizing and grinding the green pellet to obtain a preliminary powder;

(4) transferring the preliminary powder into a die; pressing at a pressure of at least 2 MPa, followed by sintering; sintering parameters comprise heating rate: $1.5°$ C./min-$15°$ C./min, temperature: $1200°$ C.-$1500°$ C., holding time: 1 h-24 h; after sintering, the product obtained is naturally cooled down to room temperature to obtain a dense ceramic pellet;

(5) polishing a surface of the dense ceramic sheet, followed by annealing; annealing parameters comprise heating rate: $1.5°$ C./min-$15°$ C./min, temperature: $1000°$ C.-$1200°$ C., holding time: 1 h-24 h; after annealing, the product obtained is naturally cooled down to room temperature to obtain the multiphase ceramic material with a giant dielectric constant.

Preferably, in step 1, the titanium source is $TiO_2$, the A source is $A_2O_5$, the B source is at least one selected from the group consisting of $B_2O_3$, $B_2(C_2O_4)_3$, $B_2(C_2O_4)_3$ hydrate, $B(NO_3)_3$, $B(NO_3)_3$ hydrate, $B_2(SO_4)_3$, $B_2(SO_4)_3$ hydrate, $B_2(CO_3)_3$, $B_2(CO_3)_3$ hydrate, $B(C_2H_3O_2)_3$, $B(C_2H_3O_2)_3$ hydrate.

The non-oxide B source can reduce the synthesis temperature of the secondary phase and reduce its mobility around the grain boundary, helping to form a discontinuously and uniformly distributed B phase.

Preferably, the ball-milling in step (2) comprises using ethanol or acetone as a dispersant, and using yttrium-stabilized zirconia balls as a ball-milling medium; ball-milling is performed for more than 12 hours; in steps (4) and (5), an atmosphere for the sintering and the annealing is air.

Preferably, the polishing of the surface in step (5) comprises rough polishing the surface by a 240-grit sandpaper, followed by finely polishing the surface by a 1200-grit sandpaper Compared with the prior art, the advantages of the present invention are discussed below.

In the present invention, rutile titanium dioxide is chemically modified by co-doping $A^{5+}$ and $B^{3+}$ metal ions to obtain a multiphase material, in which the primary phase is $A^{5+}$ and $B^{3+}$ co-doped rutile $TiO_2$ and the secondary phase ($B_2TiO_5$) is evenly dispersed in the primary phase. The multiphase ceramic material of the present application has outstanding properties including a giant dielectric constant, a low dielectric loss, and good frequency- and temperature-stability. In particular, it has a high insulation resistivity and a high breakdown voltage. The ceramic material can be used in high-energy storage devices and supercapacitors. Its detailed advantages are:

(1) The primary phase of the multiphase ceramic material with a giant dielectric constant is $A^{5+}$ and $B^{3+}$ co-doped rutile $TiO_2$, and the secondary phase of the ceramic material is $B_2TiO_5$. The secondary phase is evenly dispersed in the primary phase.

(2) The multiphase ceramic material has a high insulation resistivity and a high breakdown voltage. The ceramic material has an insulation resistivity of higher than $10^{11} \Omega \cdot cm$.

(3) At the frequency range of 20 Hz to $2 \times 10^6$ Hz and at the temperature range of $-160°$ C. to $170°$ C., the dielectric constant ($>10^4$) of the multiphase ceramic material shows very little frequency- and temperature-dependency. The dielectric loss of the ceramic material is less than 0.05, when the frequency is lower than $2 \times 10^5$ Hz from $-50°$ C. to $150°$ C.

BRIEF DESCRIPTION OF DRAWINGS

FIG. 2A shows the SE image of the multiphase ceramic material of embodiment 1; FIG. 2B shows the BSE image of the multiphase ceramic material of embodiment 1; FIG. 2C shows the SE image of the multiphase ceramic material of embodiment 2; FIG. 2D shows the BSE image of the multiphase ceramic material of embodiment 2.

DETAILED DESCRIPTION OF EMBODIMENTS

Figure 1:
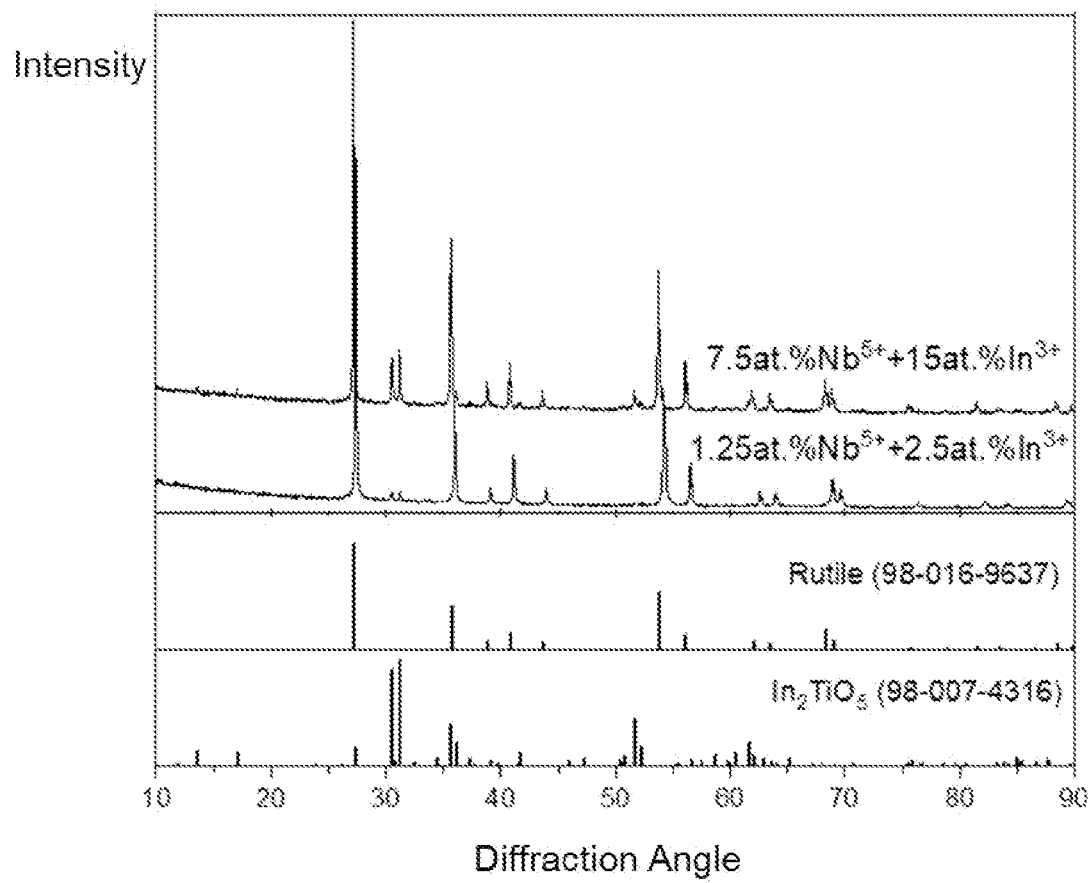
FIG. 1 shows the XRD spectra of the multiphase ceramic material of embodiment 1 and embodiment 2.
Figure 2A:
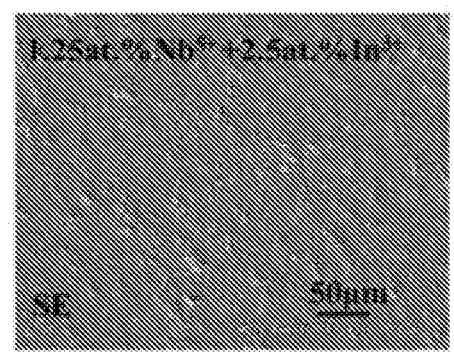
FIGS. 2A-2D shows the backscattered electron (BSE) images and the secondary electron (SE) images of the multiphase ceramic material of embodiment 1 and embodiment 2. In particular.
Figure 2B:
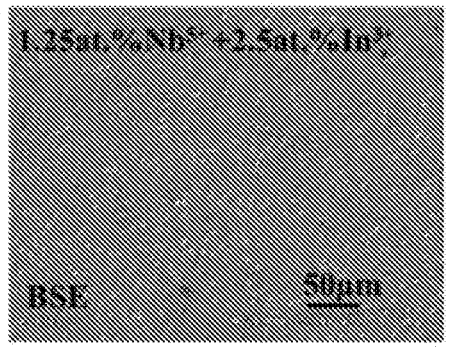
Figure 2C:
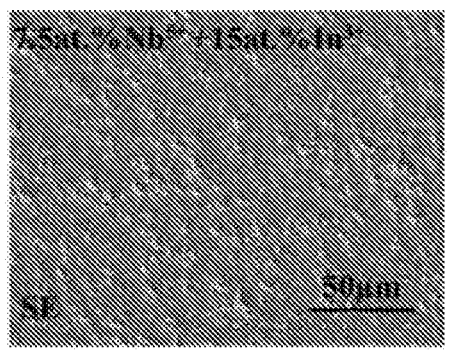
Figure 2D:
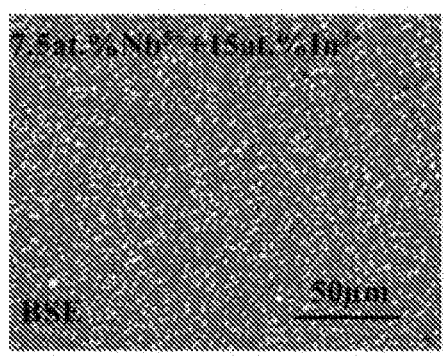

The objectives, technical solutions, and beneficial effects of the present invention will be described below with reference to the accompanying drawings and embodiments.

Embodiment 1

Embodiment 1 is one of the embodiments in the present invention. The multiphase ceramic material of this embodiment has a general formula of $A_xB_{nx}Ti_{1-(n+1)x}O_2$, where A is Nb, B is In, x=0.0125, and n=2.

The detailed method to synthesize this embodiment comprised the following steps:

(1) 0.2492 g $Nb_2O_5$, 0.5206 g $In_2O_3$, and 11.5312 g $TiO_2$ were weighed;

(2) The aforementioned reactants were placed in a ball-milling tank with the grinding medium of yttrium-stabilized zirconia balls and the dispersant of ethanol or acetone; ball-milling was carried out for more than 12 h until the reactants were thoroughly mixed; the mixture was dried to obtain a homogeneous mixture powder;

(3) The mixture powder was granulated in a mortar, and the detailed condition was: the pure water was added as the additive, and the weight ratio of pure water to the powder was 5%; mixed thoroughly; transferred the granulated powder into a 32 mm die, pressed at 416 MPa to obtain a green pellet; the green pellet was pulverized and ground in a mortar to obtain preliminary powder;

(4) The preliminary powder was transferred into a 1.2 mm die, pressed at a pressure of 2 MPa, followed by sintering in the air; sintering parameters included heating rate: 15° C./min, temperature: 1420° C., holding time: 3 h; after sintering, the product was naturally cooled down to room temperature to obtain a dense ceramic pellet;

(5) The surface of the dense ceramic pellet obtained in step (4), was polished by a 240-grit sandpaper and a 1200-grit sandpaper; annealed in the air; annealing parameters include heating rate: 15° C./min, temperature: 1200° C., holding time: 1 h; after annealing, the product obtained was naturally cooled down to room temperature to obtain the multiphase ceramic material.

Embodiment 2

Embodiment 2 is one of the embodiments in the present invention. The multiphase ceramic material of this embodiment has a general formula of $A_xB_{nx}Ti_{1-(n+1)x}O_2$, wherein A is Nb, B is In, x=0.075, and n=2.

The detailed method to synthesize this embodiment comprised the following steps:

(1) 1.4952 g $Nb_2O_5$, 3.1233 g $In_2O_3$, and 9.2849 g $TiO_2$ were weighed;

(2) The aforementioned reactants were placed in a ball-milling tank with the grinding medium of yttrium-stabilized zirconia balls and the dispersant of ethanol or acetone; ball-milling was carried out for more than 12 h until the reactants were thoroughly mixed; the mixture was dried to obtain a homogeneous mixture powder;

(3) The mixture powder was granulated in a mortar, and the detailed condition was: the pure water was added as the additive, and the weight ratio of pure water to the powder was 10%; mixed thoroughly; transferred the granulated powder into a 32 mm die, pressed at 416 MPa to obtain a green pellet; the green pellet was pulverized and ground in a mortar to obtain preliminary powder;

(4) The preliminary powder was transferred into a 1.2 mm die, pressed at a pressure of 2 MPa, followed by sintering in the air; sintering parameters included heating rate: 3.8° C./min, temperature: 1200° C., holding time: 3 h; after sintering, the product was naturally cooled down to room temperature to obtain a dense ceramic pellet;

(5) The surface of the dense ceramic pellet obtained in step (4) was polished with a 240-grit sandpaper and a 1200-grit sandpaper; annealed in the air; annealing parameters include heating rate: 5° C./min, temperature: 1000° C., holding time: 24 h; after annealing, the product obtained was naturally cooled down to room temperature to obtain the multiphase ceramic material.

Embodiment 3

Embodiment 3 is one of the embodiments in the present invention. The multiphase ceramic material of this embodiment has a general formula of $A_xB_{nx}T_{1-(n+1)x}O_2$, wherein A is Nb, B is In, x=0.0125, and n=3.

The detailed method to synthesize this embodiment comprised the following steps:

(1) 0.2492 g $Nb_2O_5$, 0.7809 g $In_2O_3$, and 11.3809 g $TiO_2$ were weighed;

(2) The aforementioned reactants were placed in a ball-milling tank with the grinding medium of yttrium-stabilized zirconia balls and the dispersant of ethanol or acetone; ball-milling was carried out for more than 12 h until the reactants were thoroughly mixed; the mixture was dried to obtain a homogeneous mixture powder;

(3) The mixture powder was granulated in a mortar, and the detailed condition was: the pure water was added as the additive, and the weight ratio of pure water to the powder was 5%; mixed thoroughly; transferred the granulated powder into a 32 mm die, pressed at 416 MPa to obtain a green pellet; the green pellet was pulverized and ground in a mortar to obtain preliminary powder;

(4) The preliminary powder was transferred into a 1.2 mm die, pressed at a pressure of 2 MPa, followed by sintering in the air; sintering parameters included heating rate: 3.8° C./min, temperature: 1420° C., holding time: 3 h; after sintering, the product was naturally cooled down to room temperature to obtain a dense ceramic pellet;

(5) The surface of the dense ceramic pellet obtained in step (4) was polished with a 240-grit sandpaper and a 1200-grit sandpaper; annealed in the air; annealing parameters include heating rate: 5° C./min, temperature: 1200° C., holding time: 1 h; after annealing, the product obtained was naturally cooled down to room temperature to obtain the multiphase ceramic material with a giant dielectric constant.

Embodiment 4

Embodiment 4 is one of the embodiments in the present invention. The multiphase ceramic material of this embodiment has a general formula of $A_xB_{nx}Ti_{1-(n+1)x}O_2$, wherein A is Nb, B is In, x=0.0125, and n=4.

The detailed method to synthesize this embodiment comprised the following steps:

(1) 0.2492 g $Nb_2O_5$, 1.0412 g $In_2O_3$, and 11.2312 g $TiO_2$ were weighed;

(2) The aforementioned reactants were placed in a ball-milling tank with the grinding medium of yttrium-stabilized zirconia balls and the dispersant of ethanol or acetone; ball-milling was carried out for more than 12 h until the reactants were thoroughly mixed; the mixture was dried to obtain a homogeneous mixture powder;

(3) The mixture powder obtained was granulated in a mortar, and the detailed condition was: the pure water was added as the additive, and the weight ratio of pure water to the powder was 5%; mixed thoroughly; transferred the mixture powder into a 32 mm die, pressed at 416 MPa to obtain a green pellet; the green pellet was pulverized and ground in a mortar to obtain preliminary powder;

(4) The preliminary powder was transferred into a 1.2 mm die; pressed at a pressure of 2 MPa, followed by sintering in the air; sintering parameters included heating rate: 3.8° C./min, temperature: 1420° C., holding time: 3 h; after sintering, the product obtained was naturally cooled down to room temperature to obtain a dense ceramic pellet;

(5) The surface of the dense ceramic pellet obtained in step (4) was polished with a 240-grit sandpaper and a 1200-grit sandpaper, followed by annealing in the air; annealing parameters include heating rate: 5° C./min, temperature: 1200° C., holding time: 1 h; after annealing, the product obtained was naturally cooled down to room temperature to obtain the multiphase ceramic material with a giant dielectric constant.

FIG. 1 shows the XRD spectra of the multiphase ceramic material with a giant dielectric constant of embodiment 1 (1.25 at. % $Nb^{5+}$+2.5 at. % $In^{3+}$) and embodiment 2 (7.5 at. % $Nb^{5+}$+15 at. % $In^{3+}$). FIG. 1 illustrates that the materials prepared in embodiment 1 and embodiment 2 have two structures, that is, rutile titanium dioxide and orthogonal $In_2TiO_5$.

FIGS. 2A-D shows the backscattered electron (BSE) images and the secondary electron (SE) images of the multiphase ceramic material with a giant dielectric constant of embodiment 1 (1.25 at. % $Nb^{5+}$+2.5 at. % $In^{3+}$) and embodiment 2 (7.5 at. % $Nb^{5+}$+15 at. % $In^{3+}$). FIGS. 2A-D further demonstrates that the materials prepared in embodiment 1 and embodiment 2 have two phases, and the secondary phase is evenly dispersed in the primary phase.

Figure 3:
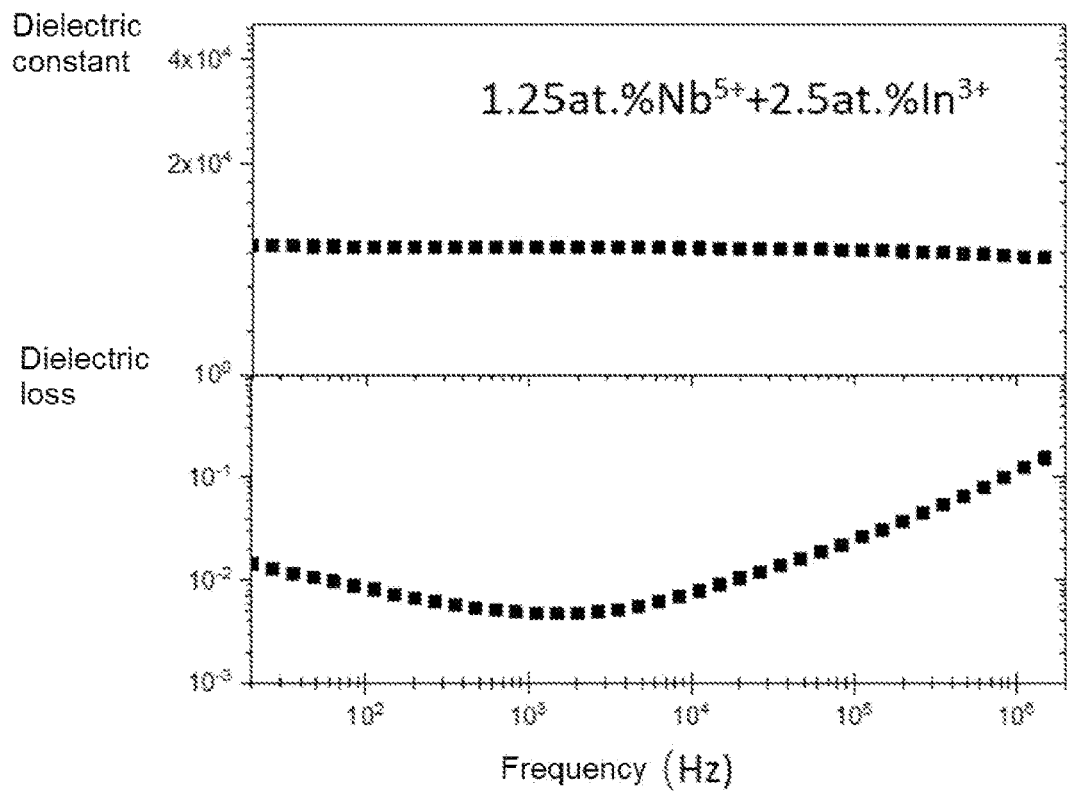
FIG. 3 illustrates the frequency-dependent dielectric properties of the multiphase ceramic material of embodiment 1, which is measured at room temperature.

FIG. 3 shows frequency-dependent dielectric properties of embodiment 1 (1.25 at. % $Nb^{5+}$+2.5 at. % $In^{3+}$) at room temperature. FIG. 3 demonstrates that at the frequency range of 20 Hz to $2\times10^6$ Hz, the dielectric constant of the ceramic material prepared in embodiment 1 (1.25 at. % $Nb^{5+}$+2.5 at. % $In^{3+}$) is higher than 10,000 and it depends very little on frequency. When the frequency is lower than $2\times10^5$ Hz, the dielectric loss is less than 0.05.

Figure 4:
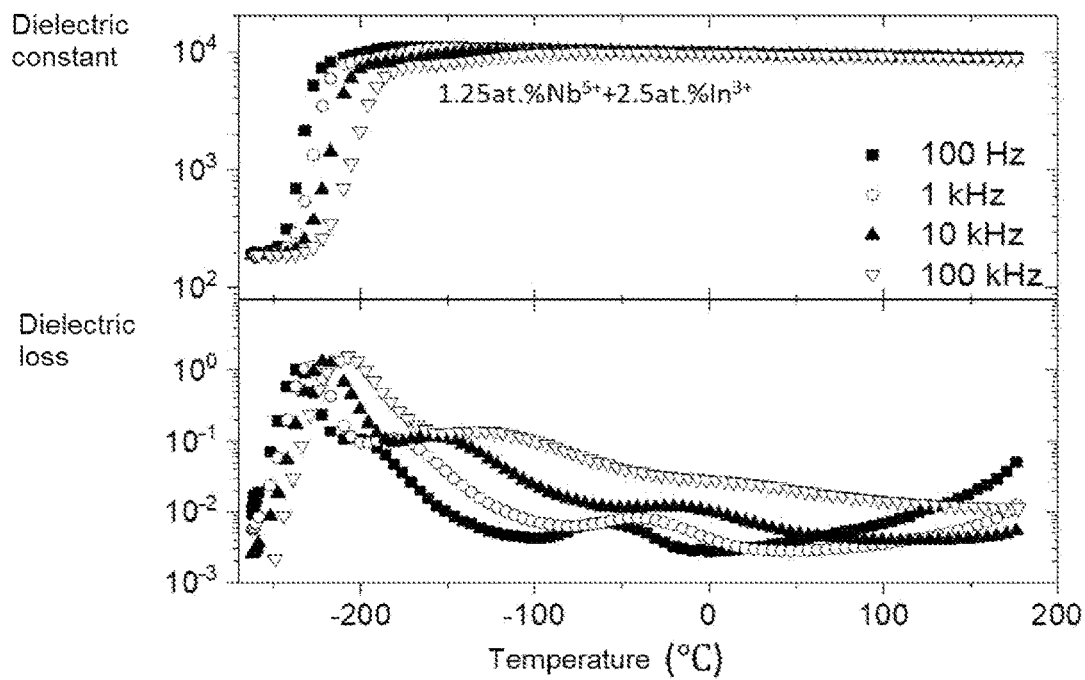
FIG. 4 illustrates the temperature-dependent dielectric properties of the multiphase ceramic material of embodiment 1 with four selected frequencies (100 Hz, 1 kHz, 10 kHz and 100 kHz) embodiment.

FIG. 4 shows temperature-dependent dielectric properties of embodiment 1 (1.25 at. % $Nb^{5+}$+2.5 at. % $In^{3+}$) and 4 frequencies (100 Hz, 1 kHz, 10 kHz and 100 kHz) were selected. FIG. 4 shows that the dielectric constant of embodiment 1 (1.25 at. % $Nb^{5+}$+2.5 at. % $In^{3+}$) is higher than 10,000 from −160° C. to 170° C. and it is almost temperature-independent. The dielectric loss is less than 0.05 from −50° C. to 150° C.

Figure 5:
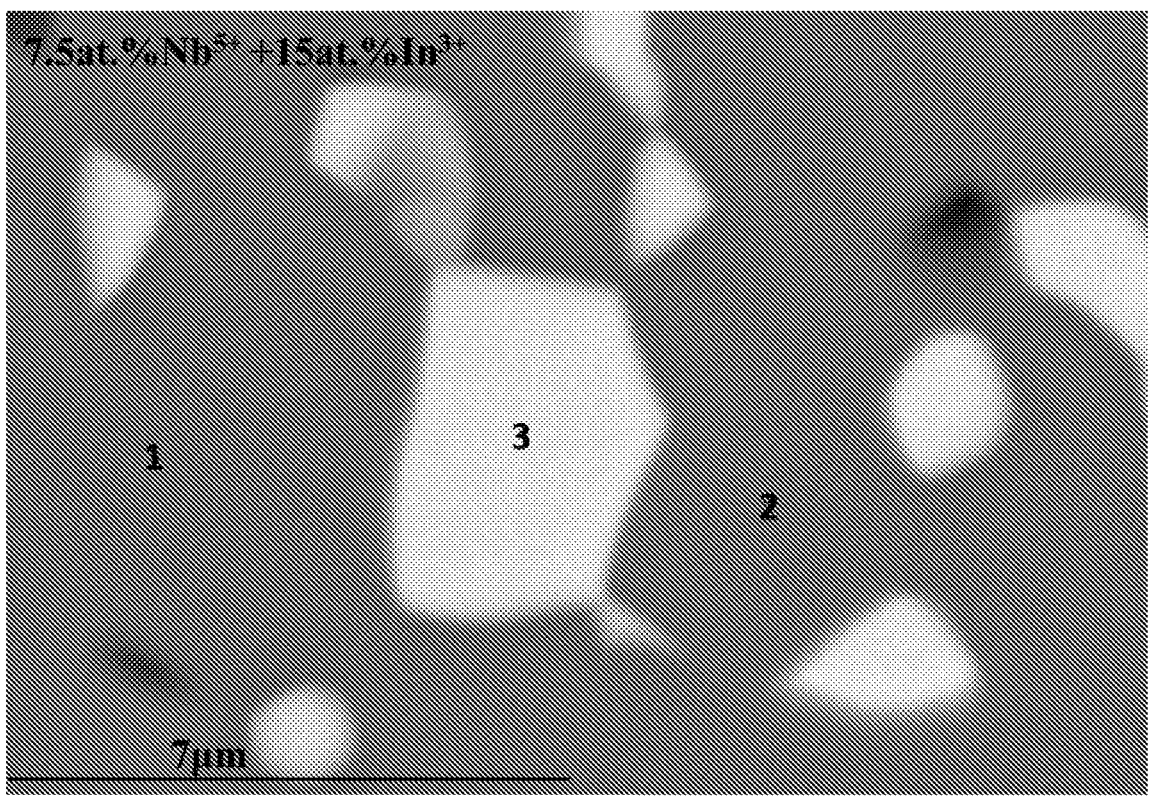
FIG. 5 is a backscattered electron (BSE) image of the multiphase ceramic material of embodiment 2.

FIG. 5 is the backscattered electron (BSE) image of embodiment 2 (7.5 at. % $Nb^{5+}$+15 at. % $In^{3+}$). Table 1 is the atomic ratio of elements of spots labelled out in FIG. 5, which was measured by the energy-dispersive spectroscopy (EDS).

TABLE 1

The atomic ratio of elements of spots labelled out in FIG. 5

| EDS # | Ti at. % | Nb at. % | In at. % |
|---|---|---|---|
| 1 | 83.30 | 8.25 | 8.46 |
| 2 | 82.92 | 8.38 | 8.69 |
| 3 | 32.93 | 0.98 | 66.09 |

FIG. 1, FIG. 5, and table 1 show that the primary phase of the multiphase ceramic materials with a giant dielectric constant is $Nb^{5+}$ and $In^{3+}$ co-doped rutile $TiO_2$, while the secondary phase is $B_2TiO_5$.

Table 2 summarizes the resistivity, the dielectric constant and the dielectric loss of the ceramic materials prepared in embodiments 1, 3, and 4 and a reference material:

TABLE 2

Resistivity, dielectric constant and dielectric loss of the materials of embodiments 1, 3, and 4 and a reference material

| n | General formula | Resistivity ($\Omega \cdot cm$) | Dielectric constant (frequency f = 1 kHz) | Dielectric loss (frequency f = 1 kHz) |
|---|---|---|---|---|
| 1 | $Nb_{1.25\%}In_{1.25\%}Ti_{97.5\%}O_2$ (Reference material) | $9.88 \times 10^{10}$ | 57000 | 0.0031 |
| 2 | $Nb_{1.25\%}In_{2.5\%}Ti_{96.25\%}O_2$ | $3.26 \times 10^{11}$ | 12000 | 0.0048 |
| 3 | $Nb_{1.25\%}In_{3.75\%}Ti_{95\%}O_2$ | $2.53 \times 10^{11}$ | 11000 | 0.0058 |
| 4 | $Nb_{1.25\%}In_{5\%}Ti_{93.75\%}O_2$ | $5.26 \times 10^{11}$ | 10000 | 0.016 |

Compared with the reference material (1.25 at % $Nb^{5+}$ 1.25 at % $In^{3+}$), the materials of embodiments 1, 3 and 4 have higher resistivity, as well as a high dielectric constant (>10,000) and low dielectric loss (<0.05). This suggests that because the secondary phase is discontinuously and uniformly distributed at the grain boundary of the primary phase, it effectively blocks the movement of weakly bounded charges, contributing to high working voltage and breakdown voltage of the material. Meanwhile, the existence of the secondary phase does not cause the deterioration of the giant dielectric property of the material.

At last, it should be noted that the aforementioned embodiments are only used to illustrate the technical solutions of the present invention that does not limit the protection scope of the present invention. Although the present invention has been described in detail with reference to the preferred embodiments, those of ordinary skill in the art should understand that the technical solution of the present invention can be modified without deviating from the essence and scope of the technical solution of the present invention.

What is claimed is:

1. A method of preparing a multiphase ceramic material with a dielectric constant of higher than 10,000, wherein the multiphase ceramic material has a general formula of $A_xB_{nx}Ti_{1-(n+1)x}O_2$; wherein A is at least one selected from the group consisting of Nb, Ta, V, Mo, and Sb, B is at least one selected from the group consisting of In, Ga, Al, Co, Cr, Sc, Fe (III), and a trivalent rare-earth cation; n is a molar ratio of B to A, $1 \leq n \leq 5$, $0 < x \leq 0.1$;

wherein the method comprises steps of:
(1) weighing reactants, which comprise a titanium source, an A source, and a B source, according to the general formula of the multiphase ceramic material, $A_xB_{nx}Ti_{1-(n+1)x}O_2$;

(2) ball-milling in a ball-milling tank and drying to obtain a homogeneous mixture powder;

(3) transferring the mixture powder into a mortar; pure water is added, and the weight of the pure water is 5%-10% of the weight of the mixture powder; mixing thoroughly;

transferring the mixture powder into a die, pressing at a pressure of at least 400 MPa to obtain a green pellet; placing the green pellet in a mortar; pulverizing and grinding the green pellet to obtain a preliminary powder;

(4) transferring the preliminary powder into a die; pressing at a pressure of at least 2 MPa, followed by sintering; sintering parameters comprise heating rate: 1.5° C./min-15° C./min, temperature: 1200° C.-1500° C., holding time: 1 h-24 h; after sintering, the product obtained is naturally cooled down to room temperature to obtain a dense ceramic pellet;

(5) polishing a surface of the dense ceramic pellet, followed by annealing; annealing parameters comprise heating rate: 1.5° C./min-15° C./min, temperature: 1000° C.-1200° C., holding time: 1 h-24 h; after annealing, the product obtained is naturally cooled down to room temperature to obtain the multiphase ceramic material with a dielectric constant of higher than 10,000.

2. The method of claim 1, wherein in step 1, the titanium source is $TiO_2$, the A source is $A_2O_5$, the B source is at least one selected from the group consisting of $B_2O_3$, $B_2(C_2O_4)_3$, $B_2(C_2O_4)_3$ hydrate, $B(NO_3)_3$, $B(NO_3)_3$ hydrate, $B_2(SO_4)_3$, $B_2(SO_4)_3$ hydrate, $B_2(CO_3)_3$, $B_2(CO_3)_3$ hydrate, $B(C_2H_3O_2)_3$, $B(C_2H_3O_2)_3$ hydrate.

3. The method of claim 1, wherein the ball-milling in step (2) comprises using ethanol or acetone as a dispersant, and using yttrium-stabilized zirconia balls as a ball-milling medium; ball-milling is performed for more than 12 hours; in steps (4) and (5), an atmosphere for the sintering and the annealing is air.

4. The method of claim 1, wherein the polishing of the surface in step (5) comprises rough polishing the surface by a 240-grit sandpaper, followed by finely polishing the surface by a 1200-grit sandpaper.

5. The method of claim 1, wherein a primary phase of the ceramic material is $A^{5+}$ and $B^{3+}$ co-doped rutile $TiO_2$, a secondary phase of the ceramic material is $B_2TiO_5$; the secondary phase is evenly dispersed in the primary phase.

6. The method of claim 5, wherein the secondary phase is $B_2TiO_5$ with an orthogonal structure.

7. The method of claim 6, wherein the multiphase ceramic material has a resistivity of higher than $10^{11} \Omega \cdot cm$.

8. The method of claim 6, wherein the multiphase ceramic material has a dielectric constant of higher than 10,000 at a frequency of 20 Hz to $2 \times 10^6$ Hz; the multiphase ceramic material has a dielectric loss of less than 0.05 when the frequency is lower than $2 \times 10^5$ Hz.

9. The method of claim 6, wherein the multiphase ceramic material has a dielectric constant of higher than 10,000 from $-160°$ C. to $170°$ C.; the multiphase ceramic material has a dielectric loss of less than 0.05 from $-50°$ C. to $150°$ C.

10. The method of claim 5, wherein the multiphase ceramic material has a resistivity of higher than $10^{11} \Omega \cdot cm$.

11. The method of claim 5, wherein the multiphase ceramic material has a dielectric constant of higher than 10,000 at a frequency of 20 Hz to $2 \times 10^6$ Hz; the multiphase ceramic material has a dielectric loss of less than 0.05 when the frequency is lower than $2 \times 10^5$ Hz.

12. The method of claim 5, wherein the multiphase ceramic material has a dielectric constant of higher than 10,000 from $-160°$ C. to $170°$ C.; the multiphase ceramic material has a dielectric loss of less than 0.05 from $-50°$ C. to $150°$ C.

13. The method of claim 1, wherein the multiphase ceramic material has a resistivity of higher than $10^{11} \Omega \cdot cm$.

14. The method of claim 1, wherein the multiphase ceramic material has a dielectric constant of higher than 10,000 at a frequency of 20 Hz to $2 \times 10^6$ Hz; the multiphase ceramic material has a dielectric loss of less than 0.05 when the frequency is lower than $2 \times 10^5$ Hz.

15. The method of claim 1, wherein the multiphase ceramic material has a dielectric constant of higher than 10,000 from $-160°$ C. to $170°$ C.; the multiphase ceramic material has a dielectric loss of less than 0.05 from $-50°$ C. to $150°$ C.

* * * * *